Dec. 2, 1930.   C. P. DUBBS   1,783,229
PROCESS AND APPARATUS FOR TREATING OILS
Original Filed Feb. 11, 1922
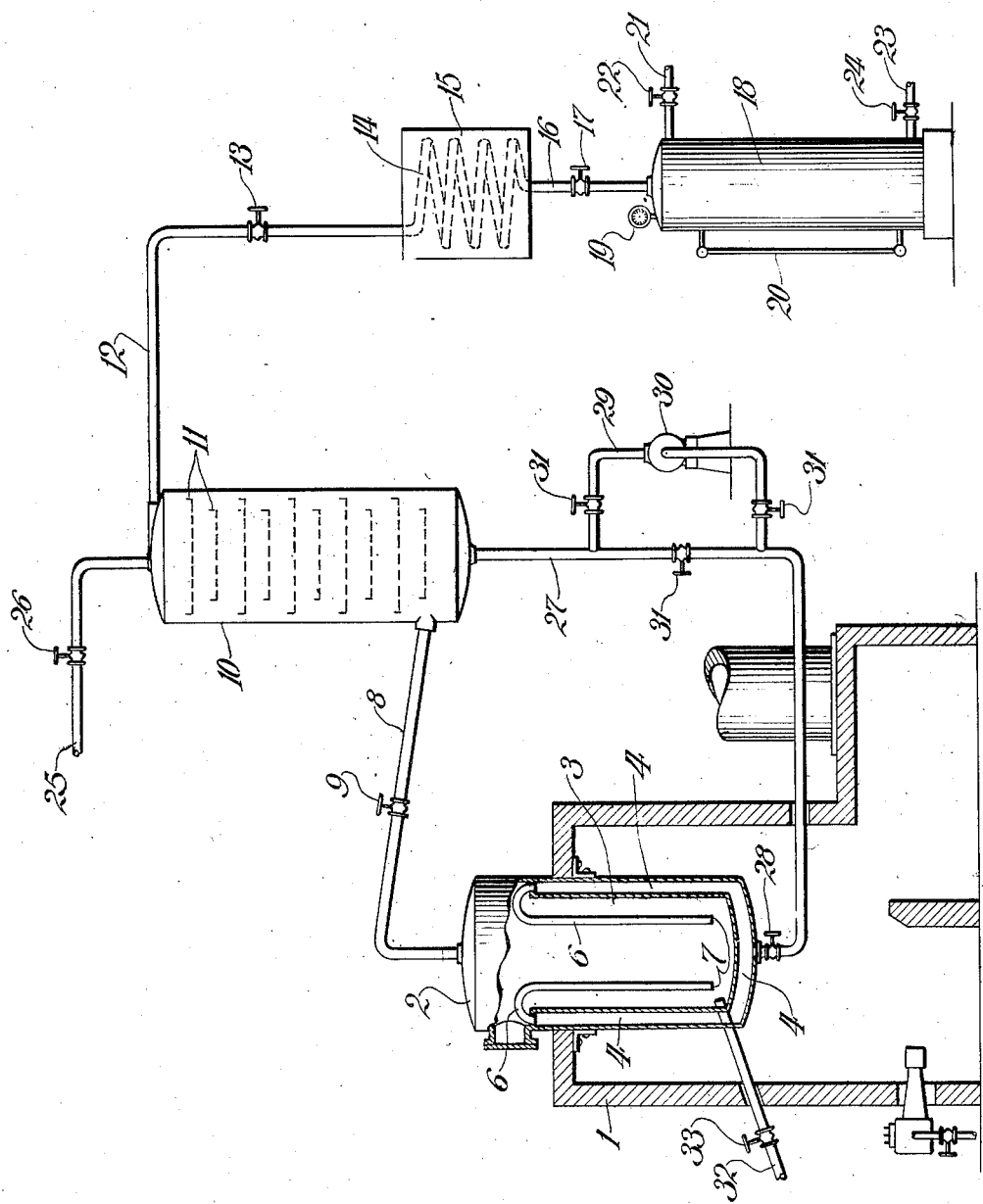
Witness:
Inventor
Carbon P. Dubbs.
By Frank L. Belknap. Atty Patented Dec. 2, 1930

1,783,229

UNITED STATES PATENT OFFICE

CARBON P. DUBBS, OF WILMETTE, ILLINOIS, ASSIGNOR TO UNIVERSAL OIL PRODUCTS COMPANY, OF CHICAGO, ILLINOIS, A CORPORATION OF SOUTH DAKOTA

PROCESS AND APPARATUS FOR TREATING OILS

Application filed February 11, 1922, Serial No. 535,783. Renewed September 14, 1928.

This invention relates to improvements in process and apparatus for treating oils and refers more particularly to a process and apparatus in which the reflux condensate or incompletely cracked portions are returned to the system for further cracking.

In the single figure of the drawing is shown a view, partly in side elevation and partly in vertical section, of my improved apparatus.

Referring more in detail to this drawing, 1 designates a furnace in which is seated the still designated as a whole 2. The still 2 may take the form of a vertical cylinder but spaced away from the wall thereof at its sides and bottom is a partition or shell 3 to form a shallow chamber 4. The upper end of the shell 3 is provided with a flange which extends to the outer wall of the still 2 so as to seal the upper end of the passage 4. The oil, however, is permitted to pass out of the passage 4 through a plurality of pipes 6, open at their lower ends as shown at 7. The pipes 6 are so constructed that they may be readily removed for cleaning, if necessary.

The vapor space of the still 2 is provided with a vapor outlet pipe 8 having a throttle valve 9 and leading to side of dephlegmator 10 having baffles 11. The upper end of the dephlegmator is connected by pipe 12 having throttle valve 13 to condenser coil 14 seated in condenser box 15. The lower end of the coil is connected by pipe 16 having throttle valve 17 to the top of receiver 18. The receiver 18 is provided with pressure gauge 19, liquid level gauge 20, gas outlet pipe 21, having throttle valve 22, liquid drawoff pipe 23 having throttle valve 24. Raw oil may be fed to the top of the dephlegmator through the feed pipe 25 having valve 26. The raw oil preheated in the dephlegmator and mixed with the reflux condensate is returned by feed pipe 27 having throttle valve 28 to the lower part of the chamber 4. If desired, a by-pass 29 having pump 30, may be provided, in which case, suitable valves 31 may be provided as shown.

The process may be operated at any desired pressure and temperature, for example, the oil may be heated to a temperature of 800 degrees F. more or less, and subjected to a vapor pressure in the still or in the still and condensing apparatus, of say, 75 pounds to several hundred pounds. In operating the process, the raw oil and reflux condensate are fed to the hottest part of the still but out of contact with the carbon containing residue contained in the main body of the still 3, which carbon containing residue may be drawn off through the pipe 32 having valve 33.

I claim as my invention:

1. In an apparatus for cracking oil, the combination with a furnace, of a still mounted therein, and provided with a circumferentially extending chamber, connections between said chamber and the main body of the still and means for feeding oil to be treated to the chamber and means for drawing off residue from the main body of the still.

2. A process for converting higher boiling point hydrocarbon oils into lower boiling point hydrocarbon oils which consists in maintaining the oil at a conversion temperature in a zone of reaction, taking off vapors and subjecting them to reflux condensation, passing said reflux condensate to a zone surrounding said reaction zone where it is heated to a conversion temperature, and discharging the cracked reflux condensate into the first zone of reaction.

3. A process for converting higher boiling point hydrocarbon oils into lower boiling point hydrocarbon oils, which consists in heating the oil to a conversion temperature in an annular zone, in discharging the cracked oil into a zone of reaction surrounded by said annular zone, in subjecting the vapors therefrom to reflux condensation, in recracking the reflux condensate, and in withdrawing residuum from one of said zones.

4. A process for converting higher boiling point hydrocarbon oils into lower boiling point hydrocarbon oils consisting in passing oil through a narrow annular passage adjacent the walls of the still where the oil is subjected to a cracking temperature, in then discharging the heated oil from said narrow passage into a main interior chamber of said still where it is maintained out of contact with the oil being heated in said narrow passage, in subjecting the vapors from said main chamber to reflux condensation, in returning the reflux condensate to said narrow passage, in withdrawing residuum from said interior chamber, and in maintaining a super-atmospheric pressure on said still.

5. A process for converting high boiling point hydrocarbon oils into lower boiling point hydrocarbon oils which consists in maintaining oil at a conversion temperature in a zone of reaction, in passing charging oil for the process and reflux condensate to an annular passage surrounding said zone of reaction and thereafter discharging it into said zone, subjecting the vapors evolved from the oil to reflux condensation to form said reflux condensate, and finally condensing and collecting as the product of the process the vapors uncondensed by said reflux condensation.

6. In an apparatus for cracking oil, the combination with a furnace and a still, of an annular partition in said still dividing its interior into an annular chamber adjacent its outer wall and a central interior chamber, means for feeding oil to be treated to said annular chamber, and means for conducting said oil from said annular chamber to the interior chamber.

7. In an apparatus for cracking oil, the combination with a furnace and a still, of an annular partition in said still dividing its interior into an annular chamber adjacent its outer wall and a central interior chamber, means for feeding oil to be treated to said annular chamber, and means for conducting said oil from said annular chamber to the interior chamber, said conducting means being removable for cleaning.

CARBON P. DUBBS.